US012614708B2

(12) United States Patent
Ferreira De Araujo et al.

(10) Patent No.: US 12,614,708 B2
(45) Date of Patent: Apr. 28, 2026

(54) DEVICE FOR EXTRACTING GASEOUS AND LIQUID PRODUCTS FROM A REACTION FLUID

(71) Applicant: TECHNISCHE UNIVERSITÄT BERLIN, Berlin (DE)

(72) Inventors: Jorge Ferreira De Araujo, Berlin (DE); Peter Strasser, Berlin (DE)

(73) Assignee: TECHNISCHE UNIVERSITÄT BERLIN, Berlin (DE)

( * ) Notice: Subject to any disclaimer, the term of this patent is extended or adjusted under 35 U.S.C. 154(b) by 749 days.

(21) Appl. No.: 17/917,832

(22) PCT Filed: Apr. 6, 2021

(86) PCT No.: PCT/EP2021/058884
§ 371 (c)(1),
(2) Date: Oct. 7, 2022

(87) PCT Pub. No.: WO2021/204769
PCT Pub. Date: Oct. 14, 2021

(65) Prior Publication Data

US 2023/0162960 A1 May 25, 2023

(30) Foreign Application Priority Data

Apr. 8, 2020 (EP) .................................... 20168721

(51) Int. Cl.
*H01J 49/04* (2006.01)

(52) U.S. Cl.
CPC ...... *H01J 49/0427* (2013.01); *H01J 49/0436* (2013.01)

(58) Field of Classification Search
CPC .......................... H01J 49/0427; H01J 49/0436
See application file for complete search history.

(56) References Cited

U.S. PATENT DOCUMENTS

| | | | | |
|---|---|---|---|---|
| 3,929,003 | A | 12/1975 | Llewellyn | |
| 5,448,062 | A * | 9/1995 | Cooks | H01J 49/0436 73/864.81 |
| 5,703,359 | A | 12/1997 | Wampler | |
| 2007/0151924 | A1* | 7/2007 | Mir | B01D 61/14 210/321.88 |
| 2017/0338090 | A1* | 11/2017 | Trimarco | G01N 1/4005 |
| 2019/0348267 | A1 | 11/2019 | Wright | |
| 2020/0013600 | A1 | 1/2020 | Clark | |

FOREIGN PATENT DOCUMENTS

| | | | | |
|---|---|---|---|---|
| JP | 2001312993 | A * | 11/2001 | H01J 49/0427 |

OTHER PUBLICATIONS

JP 2001312993A English translation (Year: 2025).*
(Continued)

*Primary Examiner* — Jennifer Wecker
*Assistant Examiner* — Jonathan Bortoli
(74) *Attorney, Agent, or Firm* — Maschoff Brennan

(57) ABSTRACT

It is provided a device and method for extracting gaseous and liquid products from a reaction fluid, in particular from an electrochemical reaction systems.

14 Claims, 7 Drawing Sheets

(56) References Cited

OTHER PUBLICATIONS

Hori, Y. et al. "Formation of hydrocarbons in the electrochemical reduction of carbon dioxide at a copper electrode in aqueous solution." Journal of the Chemical Society, Faraday Transactions 1: Physical Chemistry in Condensed Phases 85, 8 (1989): 2309-2326.
Peyman Khanipour et al, "Electrochemical Real-Time Mass Spectrometry (EC-RTMS): Monitoring Electrochemical Reaction Products in Real Time", Angewandte Chemie,vol. 58, No. 22, May 27, 2019 (May 27, 2019), p. 7273-7277.
O. Wolter et al, "Differential Electrochemical Mass Spectroscopy (DEMS)—a New Method for the Study of Electrode Processes", Berichte Der Bunsen-Gesellschaft Fur Physikalische Chemie., vol. 88, No. 1, Jan. 1, 1984 (Jan. 1, 1984), p. 2-6, XP055725883.
Lapack M A et al, "Valved Sampling Cell for Membrane Introduction Mass Spectrometry", Analytical Chemistry, American Chemical Society, vol. 68, No. 17, Sep. 1, 1996 (Sep. 1, 1996), p. 3072-3075.
Bauer S Ed—Seger Christoph et al, "Membrane introduction mass spectrometry; an old method that is gaining new interest through recent technological advances", TRAC Trends in Analytical Chemistry, Elsevier, Amsterdam, NL, vol. 14, No. 5, May 1, 1995 (May 1, 1995), p. 202-213.
S. Bruckenstein et al. (JACS, 1971 , 93(3): 793-794].
O. Wolter et al. (Berichte der Bunsen-Gesellschaft, 1984, 88(1): 2-6].
A. H. Wonders et al. (J. App. Electrochem.,2006, 36(11): 1215-1221].
B. D. Trimarco et al. (Electrochim. Acta, 2018, 268: 520-530).
Clark et al. (Anal. Chem., 2015, 87 (15): 8013-8020).
Nocera, D.G. "Chemistry of Personalized Solar Energy." Inorganic Chemistry 48 (2009): 10001-10017.

* cited by examiner

DEVICE FOR EXTRACTING GASEOUS AND LIQUID PRODUCTS FROM A REACTION FLUID

CROSS-REFERENCE TO A RELATED APPLICATION

This application is a National Phase Patent Application of International Patent Application Number PCT/EP2021/058884, filed on Apr. 6, 2021, which claims priority of European Patent Application Number 20 168 721.7, filed on Apr. 8, 2020.

The disclosure relates to a device for extracting gaseous and liquid products from a reaction fluid and a method for extracting gaseous and liquid products from a reaction fluid using said device.

BACKGROUND

The latest trends in electrochemical energy conversion processes have increased the demand for fundamental information on electrochemical behaviors and reaction mechanisms. The design of efficient and cost-effective catalysts is fundamental for many electrochemical energy conversion and storage solutions, such as Oxygen evolution reaction (OER) or $CO_2$ electroreduction reaction ($CO_2RR$), which are central to future sustainable energy applications due to their ability to facilitate energy storage in chemical bonds. Understanding and assessment of electrode reactions are critical for further developing and optimizing materials to design effective catalysts and achieve high activity.

Electrochemical experiments performed in aqueous media, i.e., electrolytes, are limited by the number of in-situ techniques available to inspect and observe the reaction at the catalyst surface. In field electrocatalytic scientific research and process monitoring, the precise identification of reaction products and intermediates has significant advantages not only for understanding reaction mechanisms, but also in reducing use of precious metal at the catalysts materials need for characterization during analysis for gas and liquid evolving reaction, in addition to a more sensitive and time-resolved analysis technique.

Such analyses are typically carried out in offline conditions, with the reaction products being isolated and transfer for the analysis process involving too many repetitions of the experiments and use of several expensive instrumentations such as gas chromatography-mass spectrometry (GC-MS) and nuclear magnetic resonance (NMR). Moreover, the collection and transfer of reaction products can potentially result in inaccurate analysis, due to the earlier evaporation and loss of products or low chemical stability. The analysis of shorter-lived intermediates and reaction products has been more difficult in offline mode.

Today, researchers use the in-situ methods by combining flow cell system analytic techniques. This combination has resulted in a larger number of new in-situ electrochemical systems (e.g., infrared spectrophotometric techniques—FTIR, surface enhanced Raman spectroscopy) and gas and liquid chromatography analysis technologies (e.g., online gas chromatography-GC, high performance liquid chromatographer—HPLC) as perhaps the most widely used spectroscopic techniques. In mass spectrometry—MS, an analyte is ionized and separated according to the mass-to-charge ratio (m/z), which offers versatility for quantification of different volatile product mixtures and in small volumes. One may make inferences regarding the chemical composition of the analyte, from the intensity and relative fragmentation abundance of the m/z ratios of ions. A mass spectrometer consists of an ion source, mass analyzer, and a detector, which operate under an extremely low working pressure of around 1.0 $E^{-8}$ bar due to the high reactivity of ions.

The coupling of electrochemistry with MS has led to a technique called differential electrochemical mass spectrometry (DEMS), where an electrochemical flow cell accelerates the diffusion process of reaction products to the liquid/vacuum interface. The designing of flow systems promotes an enhanced mass transport mechanism, resulting in fast product detection at millisecond range (real-time analysis). The DEMS technique has found application in areas such as electrocatalysis, electrosynthesis, batteries, chemical sensors and corrosion.

Therefore, in-situ electrochemical mass spectrometry analysis has been demonstrated to be the most versatile in-situ technique due to the capability it offers of several analyses such as dynamic determination of rate of reaction product formation, identification of products (fragmentation patterns), catalyst reactivity (onset potentials), reaction mechanism identification (isotopologue distribution) and faradaic efficiencies (FE %).

Give these advantages, the in-situ technique has become a very effective method for onsite analysis. However, its application is limited to a reaction cell and aliquot collector design approach. Generally, these cell structures are composed of a thin layer of electrolyte flowing on the surface and built within the reaction compartment, which results in large electrochemical ohmic resistance and consequently incorrect potential assignment, low sensitivity, complex structures catalyst/electrode assembling and size limitations. Several structural designs have been suggested over the years to overcome these limitations, but none of them appears to result in a general solution for multiple and diverse electrochemical reaction systems.

The coupling of electrochemistry reaction cell in online technique with a mass spectrometer was first suggested by S. Bruckenstein et al. (JACS, 1971, 93 (3): 793-794). The authors suggest a simple approach by directly depositing the working electrode catalysts on a hydrophobic PFTE material placed onto a frit at the vacuum entrance, resulting in an ideal interface between the electrochemical cell and the mass spectrometer (MS). The term Differential Electrochemical Mass Spectrometry (DEMS) was later introduced by O. Wolter et al. (Berichte der Bunsen-Gesellschaft, 1984, 88 (1): 2-6), in their work where product concentration variation was measured at periods of millisecond scale. However, the application requires the use of a micrometer thick layer of electrolyte over the electrode surface, which results in high electrochemical reaction resistance. A simple approach attempts to avoid large ohmic resistance using a tip membrane inlet near the reaction catalyst and placed directly in conventional reactors, as was presented by A. H. Wonders et al. (J. App. Electrochem., 2006, 36 (11): 1215-1221). The setup consisted of an inlet to the MS with a 150 μm diameter (i.d.) PTFE capillary tube, to which a 20 nm pore size Gore-Tex membrane was secured with heat-shrink tubing.

Recent publications that describe unique designs of thin layer electrolyte reactors with an internal extractor system promise a system comparable to conventional electrochemical reactor reaction solutions, as presented by B. D. Trimarco et al. (Electrochim. Acta, 2018, 268:520-530) and by Clark et al. (Anal. Chem., 2015, 87 (15): 8013-8020). However, these systems have complex designs and are specific only to a small number of applications, and due to the stagnant thin layer solution configuration, they often suffer from poor electrochemical conductivity, which excludes many applications.

In addition, important efforts have been made to detect both gas and liquid products, as recently presented by P. Khanipour et al. (Angew. Chem. Int. 2019, 58 (22): 7273-7277). In this experiment the authors used a combination apparatus of EI-QMS for gases and DART-TOF-MS for liquids and a liquid electrolyte nebulizing process with the aid of a high-flow gas stream. The method involves complicated sample transfer steps between two analytical instruments and laborious liquid extraction. Therefore, there is an urgent need for the development of analytic techniques that are fast, highly selective and sensitive, so as to be able to identify different reaction products, particularly a clear separation of gases and liquids, in addition to the reactant.

In a word, all the above-mentioned techniques involve use of reaction extractor systems that do not provide flexibility, and many a time do not constitute a complete solution for both gaseous and liquid products as is essential for electrochemical applications, given the increased importance and demand for electrochemical product analysis. Therefore, a new approach to in-situ electrochemical analysis is required that is simple, rapid, specific, sensitive, inexpensive, easy to use and portable. Furthermore, methods and systems are needed that can accomplish multiple reaction mechanisms in parallel analysis through local feed of isotope labelling reactant. In addition, a need exists for time-resolved electrochemical reaction analysis that can continuously monitor the progress of a reaction to obtain kinetic or process control situation with periodical sample analysis, and where results are desired quickly. Electrochemical reactions have an important role as a storage solution for renewable energy, and it is desirable that they are analyzed in situ (e.g., electrolysis, fuel cell and redox flow batteries).

SUMMARY

It is thus an object underlying the proposed solution to provide a device that overcomes the above described drawbacks.

This object is solved with a device having features as described herein.

Accordingly, a device for extracting gaseous and liquid products from a reaction fluid, in particular from an electrochemical reaction systems, is provided, wherein the device comprises

- at least one inlet for a flow of a reaction fluid comprising dissolved gaseous reaction products and liquid reaction products to be analyzed into the device,
- at least one outlet for a flow of a fluid depleted of said gaseous reaction products and liquid reaction products out of the device;
- at least two compartments, wherein
  - a first compartment is configured for separating the gaseous reaction products (to be analyzed) from the reaction fluid using a first membrane supported on a porous material, and
  - a second compartment is configured for subsequently separating/evaporating the liquid reaction products (to be analyzed) from the reaction fluid using a second membrane supported on a porous material,
- wherein the first and the second compartment are connected by an extended capillary tube system,
- wherein the capillary tube system is configured to guide the reaction fluid from the inlet into the first compartment for contacting the first membrane for separating the gaseous reaction product from the reaction fluid and subsequently into the second compartment for contacting the second compartment for separating the liquid reaction product from the reaction fluid;
- wherein each of the at least two compartments is connected to a corresponding vacuum source for applying a vacuum to the first and second membrane, respectively, for transferring the flux of gaseous reaction products and liquid reaction products through the corresponding first or second membrane into the vacuum for further analysis, in particular MS analysis.

Thus, a device is provided that enables in-situ chemical reaction followed by mass spectrometry characterization. An efficient online gas and liquid products extractor for in-situ chemical reaction studies with mass spectrum is provided, which is applicable for high resolution analysis at time-resolved product determination. In order to achieve high resolution analysis, especially in electrochemical reaction systems, a large volume of catalysts is typically used, besides application of multiple instrumentation for a suitable catalytic reaction analysis. The extractor is composed of an extended capillary tube as a solution inlet, and the products are separated in two distinctive compartments, one for gas and the other for liquid products. An intense vacuum regime is applied at the separation compartment through a hydrophobic membrane interface and flux from the diluted gas and evaporated liquid is transferred into the vacuum for further MS analysis. An in-situ product analysis technique is desirable, due to the lower amount of reaction products necessary for analysis and the capability of further characterization of reaction kinetics.

The device provides a tool for local analysis of catalytic reaction products, with the capability to quantify gas or liquid products from oxygen reduction reaction (ORR), the oxygen evolution reaction (OER), electroreduction of $CO_2$ ($CO_2$RR), liquid fuel cells (LFC) and battery systems. The extractor structure comprises of an extended dual capillary liquid flow channel, a two-layer compartment separator of gas and liquid products from incoming liquid flow and saturator system at the liquid injected over the catalyst surface.

It is beneficial to extract all gas compounds from the incoming solution before the next step where the liquid compounds are evaporated. In case of traditional system with only one membrane, the evaporation of liquid cannot be efficiently accomplished due to the low pressure drop under membrane/vacuum interface. The present device is a conjugation of different porous size membranes and the improved flow field with enhanced cross-flow that allows a separation individual phases from a liquid solution.

As described in more detail further below, the present device provides a local analysis of catalytic reaction products, without interfering with the electrochemical process. This system is suitable for reaction processes that require large electrical current to run the catalytic reaction at high efficiency, resulting in simultaneous formation of gas and liquid products. The dual capillary consists of an extended tube made of inherently polymeric material (such as PEEK, PFA, PTFE, PCTFE), and composed internally of two channels: 1) The injection channel where the electrolyte is previously saturated with reactant gas (i.e., $CO_2$ or CO) via contact of liquid electrolyte and gas through a hydrophobic membrane interface and, upon continuous flowing of the electrolyte over it, and 2) The collection channel where the products of the reaction together with the liquid electrolyte are collected and transported to the two-layer compartment separator structure.

The separation structure is composed of a two-layer compartment interconnected with internal channels, where the upper or first separator layer is directly connected to the collection channel, and only gas products from the incoming electrolyte flow are separated.

The gas and liquid products are separated from the electrolyte via interface with a hydrophobic PTFE membrane of selected porosity size and the diffusion transport affected by vacuum level.

The upper layer of separation extracts the dissolved gas products via interface with the hydrophobic PTFE membrane and a combination support membrane of porous material. The bottom layer of separation extracts the remaining reaction products, especially with high efficiency for diluted liquid products. The enhanced collection is part due four inlet capillaries promoting a turbulent flow over the interface of hydrophobic PTFE membrane.

In both layers the separation of gas and liquid products is done via a constant vacuum level. In case of the upper layer the separation, a high extraction efficiency of gas products result due to a direct contact with dissolved gas over the nano-scale size of porous membrane, whereas in the bottom layer the extraction of liquid occurs due to the intense evaporation process of the volatile products in contact with the vacuum.

In an embodiment of the present device the first and second compartments are aligned along one same axis. In particular, the first and second compartment are arranged inversely or back-to-front along the same axis.

In a further embodiment of the present device each of the two compartments comprise a first ring with an opening and a second ring with an opening, wherein in the opening of the first ring a round piece or disc type piece with an inserted or incorporated capillary tube system is arranged (capillary tube system is worked into the material of the round piece or disc) and in the opening of second ring the respective porous material is arranged.

In a preferred embodiment of the present device the respective first or second membrane is placed between the first and the second ring. Thus, thus the membrane is sandwiched or interposed between the first and second ring.

It is furthermore preferred that the second ring of each compartment is provided with a connection to the vacuum source.

The parts of the present device that are in contact with the liquid are preferably made of PEEK, PCTFE or TEFLON material, whereas the parts for the vacuum are made of stainless steel. In another embodiment of the present device a (further) disc with the at least one flow inlet and the at least one flow outlet is arranged between the first and the second compartment, in particular between the first ring of the first compartment and the second ring of the second compartment. Said disc with inlet and outlet is sandwiched or interposed between first and second compartment. The Inlet and outlet capillaries are incorporated or worked into the disc material. Inlet and outlet capillaries of the disc are in communication with the capillary system of the round piece/disc inserted into the opening of the first ring of each compartment.

The extended capillary system is now further described in more detail. The inlet capillary distributes the incoming flow of the reaction fluid to two horizontal capillaries. Each of the two horizontal capillary (i.e. parallel to the membrane) is connected in turn to two vertical capillaries (i.e. vertical to the membrane) with openings at the membrane corners. The membrane is connected with capillary tubes. Thus, the incoming flow is distributed to four capillaries that are in communication with the membrane, in particular four corners of a membrane. The four vertical capillaries promoting turbulent flow over the interface of the membranes. The incoming reaction fluid flows from the membrane corners over the membrane surface to the center of the membrane. While the reaction fluid flows over the first membrane the gaseous reaction product is separated through the membrane into the vacuum system. In the center of the (first) membrane is another capillary to guide the fluid depleted from gaseous products from the first compartment to the second compartment. In the second compartment the arrangement of the capillary system is basically the same as in the first compartment (mirror image). In the second compartment the reaction fluid (now depleted from the gaseous products) is guided through the inlet capillary, two horizontal capillaries and four vertical capillaries over the second membrane, and the liquid reaction products are extracted or evaporated from the reaction fluid into the vacuum system. The reaction fluid now depleted of the gaseous and liquid reaction products flows through the outlet out of the device.

The compartments including the rings, discs and membranes with frit porous material are enclosed by an insulation cover. The insulation cover may comprise a sleeve that houses the compartments and two plates (with openings for the connection to the vacuum sources) that are closely attached to sleeve ends.

As mentioned previously above, the first and second membrane of the device are made of polytetrafluorethylene (PTFE), polyetheretherketone (PEEK), polyvinylidenfluoride (PVDF), Silicone, or a film or thin layer may be directly deposited on the porous material.

In an embodiment of the present device the first membrane in the first compartment has a porosity between 10 and 30 nm, preferably 20 nm and a thickness between 100 and 200 μm and the porous material, for example a frit, in the first compartment has porosity between 0.3 and 0.8 μm, preferably 0.5 m and a thickness between 2 and 6 mm, preferably 4 mm.

In another embodiment of the present device the second membrane in the second compartment has a porosity between 30 and 80 nm, preferably 50 nm and a thickness between 100 and 200 μm and the porous material, for example a frit, in the second compartment has porosity between 5 and 15 μm, preferably 10 μm and a thickness between 2 and 6 mm, preferably 4 mm.

In another embodiment the second membrane may be coated with porous metal catalyst layer (platinum, nickel, gold) with thickness of 50-500 nm. This layer act as anode electrode that electrochemically oxidizes ionic species (i.e. formate, bicarbonate, ammonium, and chloride) or large organic compounds (i.e. glucose) dissolved in the fluid, and promote their evolution to volatile MS detectable compounds such as $CO_2$, $N_2$, $NO_2$, $Cl_2$ and $ClO_2$.

In another aspect the mass spectrometer is connected to the collecting device via an extended tube or capillary (for example with a diameter of 150-1000 μm and a length 1 m). The differential pressure generated between the collecting device and the mass spectrometer is constant around 10-6 to 10-8 mbar making it ideally suited for MS analysis.

The present device is applicable in a method for collecting gaseous and liquid reaction products from a reaction fluid using a device as described above comprising the steps:

- Feeding a reaction fluid comprising dissolved gaseous reaction products and liquid reaction products to be analyzed into the device through at least one inlet into the first compartment;

separating the gaseous reaction products (to be analyzed) from the reaction fluid in the first compartment using a first membrane supported on a porous material, subsequently separating/evaporating the liquid reaction products (to be analyzed) from the reaction fluid in the second compartment using a second membrane supported on a porous material, transferring the flux of gaseous reaction products and liquid reaction products through the corresponding first or second membrane into the vacuum for further analysis, in particular MS analysis, and guiding a flow of a fluid depleted of said gaseous reaction products and liquid reaction products out of the device through at least one outlet.

Thus, the reaction fluid is guided from the flow inlet through the capillary system of the disc to the capillary system of the round/piece within the first compartment ring and subsequently over the first membrane for separating the gaseous reaction products (to be analyzed) from the reaction fluid. The reaction fluid depleted from the gaseous products is subsequently guided from the first compartment back through the disc into the second compartment, specifically into the capillary system of the round/piece within the second compartment ring to the second membrane for separating/evaporating the liquid reaction products (to be analyzed) from the reaction fluid.

Finally, the reaction fluid now depleted of the gaseous and liquid reaction products is guided through the flow outlet in the disc out of the device.

In an embodiment of the present method the pressure in the first compartment is between 5 and 15 mbar, preferably 10 mbar, and the Inlet pressure in the second compartment is between 50 and 150 mbar, preferably 100 mbar. For example, the inlet pressure in the first compartment (gas separation side) may be 10 mbar, and the inlet pressure in the second compartment (liquid separation side) may be 100 mbar. The volumetric flow rates through the device are between 0.01 and 0.1 $cm^3/s$.

The vacuum that is applied to the first compartment for separating the gaseous reaction products form the reaction fluid and to the second compartment for separating the liquid reaction products from the reaction fluid is between $10^{-2}$ and $10^{-3}$ mbar. The pressure drop over membranes is provided by a suitable vacuum source such as a turbo molecular pump (e.g. TMP Hipace 80).

BRIEF DESCRIPTION OF THE DRAWINGS

The proposed solution is described in the following in more detail with reference to the figures.

DETAILED DESCRIPTION

Figure 1:
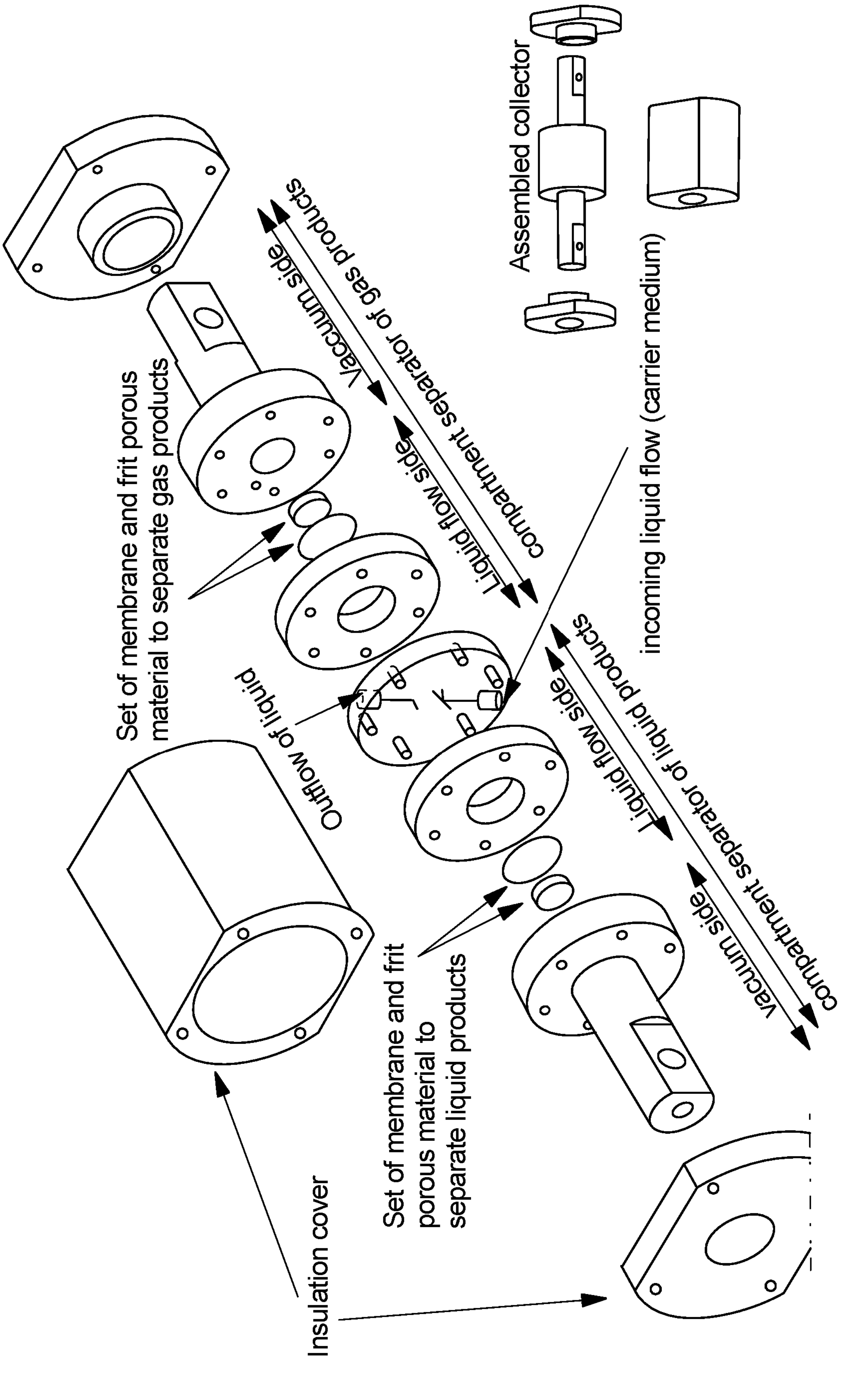
FIG. 1 shows a view of the separating device according to the solution.

FIG. 1 is an explosion view of the two-layer compartment separator of gas and liquid products from incoming reaction fluid according to the solution. As illustrated in FIG. 1 a first compartment (or chamber) is configured for separating or extracting the gaseous products from the reaction fluid and a second compartment (or chamber) is configured for separating or extracting the liquid products from the reaction fluid. Each comparment comprises a set of membrane and frit porous material. Each compartment is in communication with a vacuum side. In the right corner of FIG. 1 the assembled collector is illustrated.

Figure 2:
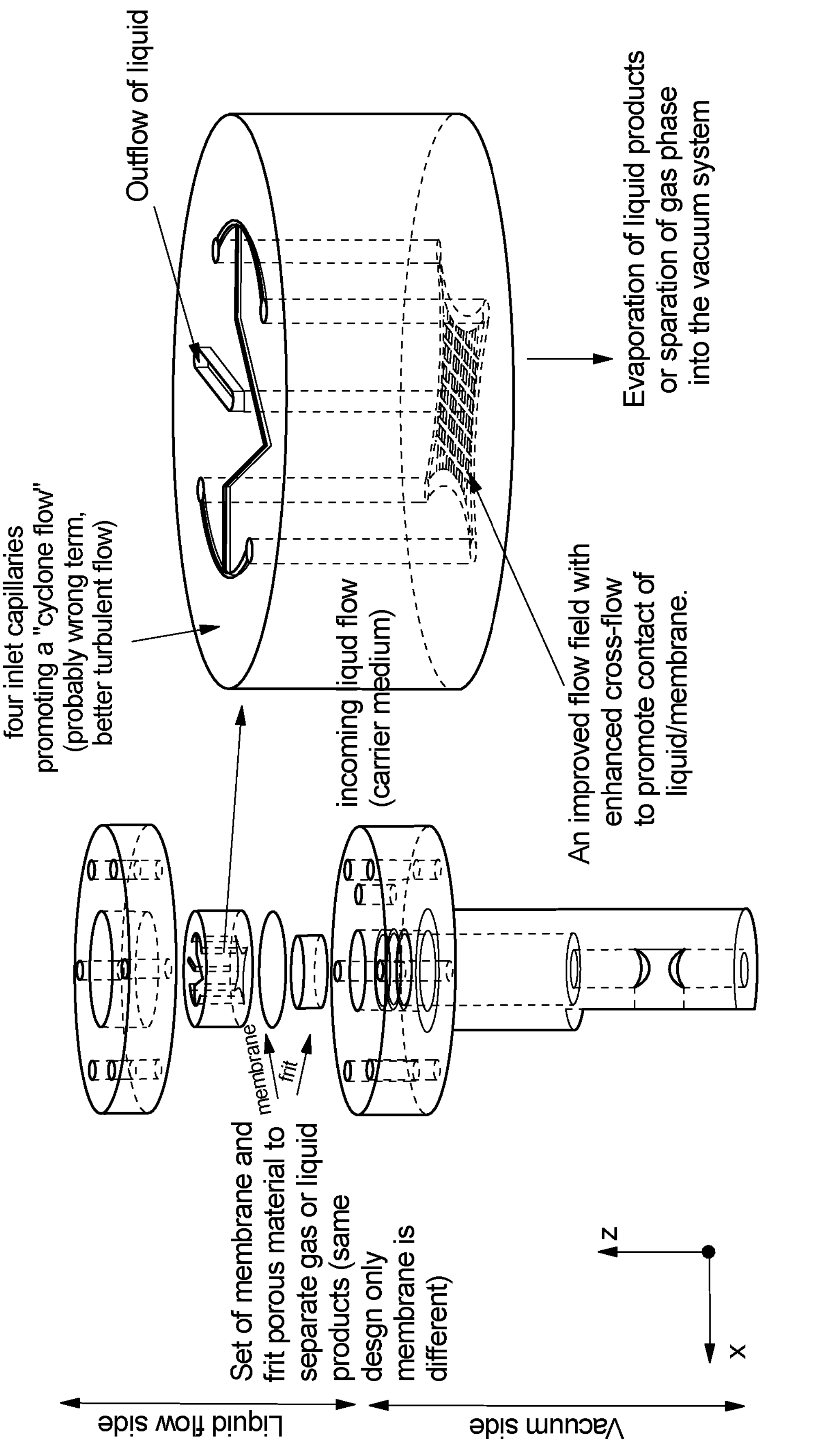
FIG. 2 shows a view of one separation layer of the device according to the solution.
Figure 3:
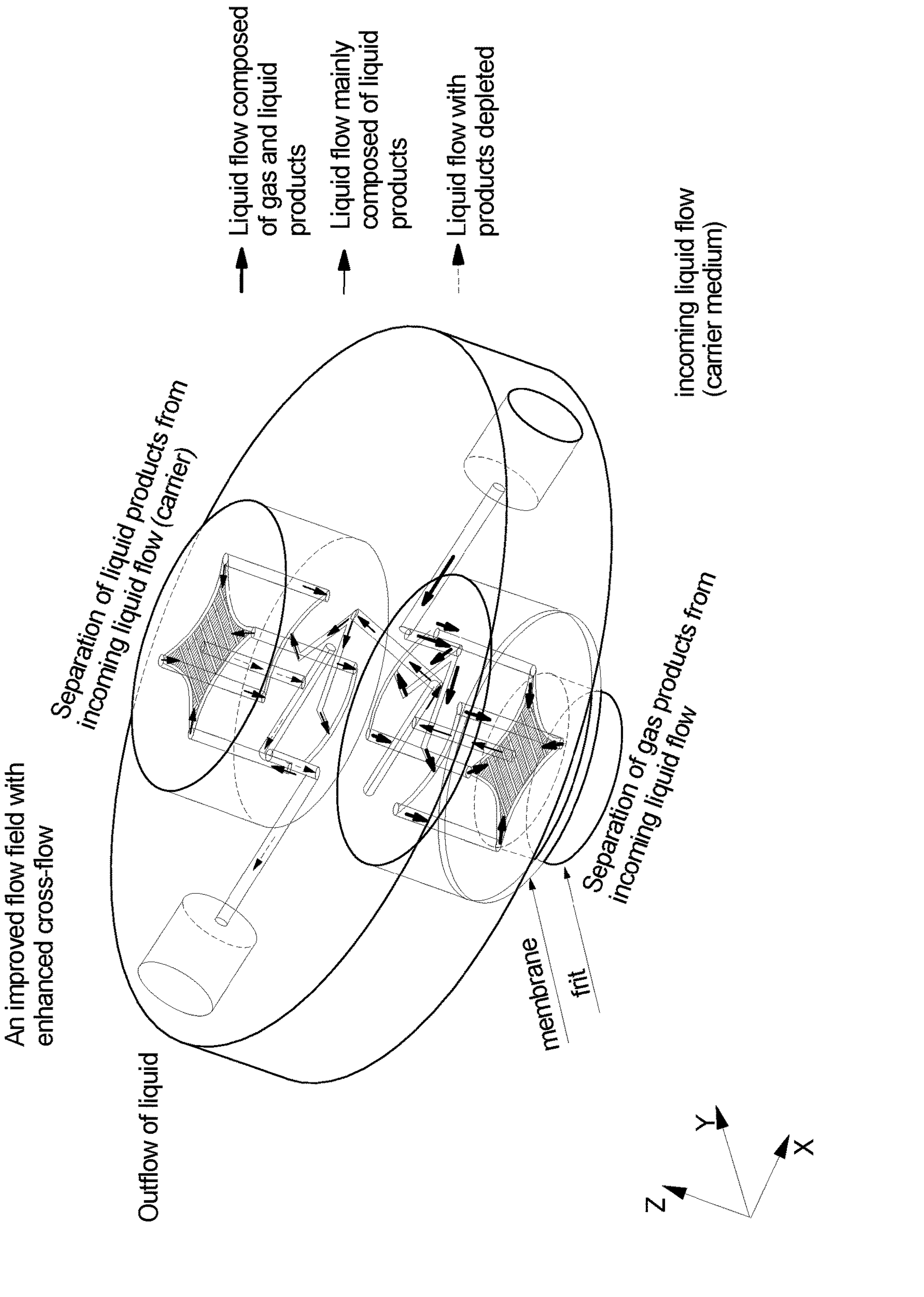
FIG. 3 shows a view of the flow through the capillary system of the device according to the solution.

In FIG. 2 one separation layer or compartment is presented in detail showing the components of one of the sides of the evaporator. FIG. 3 illustrates the flow of the reaction fluid through the capillary system of the device according to the solution.

As illustrated in FIGS. 1 and 2 each of the two compartments comprise a first ring with an opening and a second ring with an opening. The diameters of the first and second ring are approx. the same.

The opening of the first ring houses a round piece or disc type piece with an inserted or incorporated capillary tube system is arranged (capillary tube system is worked into the material of the round piece or disc)

The opening of second ring houses a frit porous material. The first or second membrane is placed between the first and the second ring. Thus, thus the membrane is sandwiched or interposed between the first and second ring. The membranes may be made of PTFE, PEEK or PVDF. The first membrane of the first compartment has porosity of 20 nm and thickness of 200 to 100 micrometers and frit with thickness of 4 mm and porosity of 0.5 micrometers. For second side, the membrane layer and frit is composed by a membrane with porosity of 50 nm thickness of 200 to 100 micrometers and frit with thickness of 4 mm and porosity of 10 micrometers.

A further disc (having approximately the same diameter as the first and second ring) is arranged between the first ring of the first compartment and the second ring of the second compartment. Said disc comprises a flow inlet and a flow outlet. The Inlet and outlet capillaries are incorporated or worked into the disc material. Inlet and outlet capillaries of the disc are in communication with the capillary system of the round piece/disc inserted into the opening of the first ring of each compartment.

The first and second compartments are aligned back-to-front along the same axis. The second ring of each compartment is provided with a connection to the vacuum source.

The compartments including the rings, discs and membranes with frit porous material are enclosed by an insulation cover. The insulation cover may comprise a sleeve that houses the compartments and two plates (with openings for the connection to the vacuum sources) that are closely attached to sleeve ends. The Insulation cover is made of PMMA material and two plates made of stainless steel.

The extended capillary system is now further described in more detail (FIGS. 2 and 3). The inlet capillary distributes the incoming flow of the reaction fluid to two horizontal capillaries. Each of the two horizontal capillary (i.e. parallel to the membrane) is connected in turn to two vertical capillaries (i.e. vertical to the membrane) with openings at the membrane corners. The membrane is connected with capillary tubes. Thus, the incoming flow is distributed to four capillaries that are in communication with the membrane, in particular four corners of a membrane. The four vertical capillaries promoting turbulent flow over the interface of the membranes. The incoming reaction fluid flows from the membrane corners over the membrane surface to the center of the membrane. While the reaction fluid flows over the first membrane the gaseous reaction product is separated through the membrane into the vacuum system. In the center of the (first) membrane is another capillary to guide the fluid depleted from gaseous products from the first compartment to the second compartment. In the second compartment the arrangement of the capillary system is basically the same as in the first compartment (mirror image). In the second compartment the reaction fluid (now depleted from the gaseous products) is guided through the inlet capillary, two horizontal capillaries and four vertical capillaries over the second membrane, and the liquid reaction products are separated or evaporated from the reaction fluid into the vacuum system. The reaction fluid now depleted of the gaseous and liquid reaction products flows through the outlet out of the device.

Example 1

Detection time is crucial for studying the electrochemical reaction. The gas collector is able to detect $H_2$ gas, at differential periods of around 100 millisecond range, as presented in FIG. 4. Such highly sensitive measurement allows to evaluate the reaction kinetics, despite the undesired liquid media interface at MS. The intensity of MS signal results from the applied electrochemical charge. Short period of reaction also represents low intensity signals. Nevertheless, the catalytic reaction has limited detection possibility at time range within 50 ms, where signals are at noise level of detection.

Figure 4:
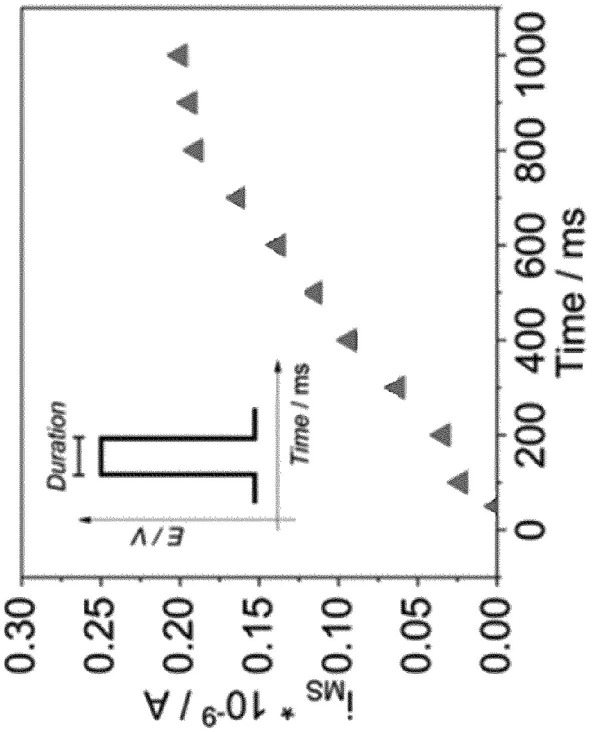
FIG. 4 shows mass fragments for m/z 2 recorded during the hydrogen evolution reaction using the device according to the solution.

FIG. 4 shows mass fragments for m/z 2 recorded during the hydrogen evolution reaction resulting from step of potential with a defined duration of steps, during electro-reduction process of instantaneous hydrogen evolution at the Pt catalyst (metal disk) Ø5 mm Electrolyte: 0.05 M $H_2SO_4$.

Example 2

Figure 5:
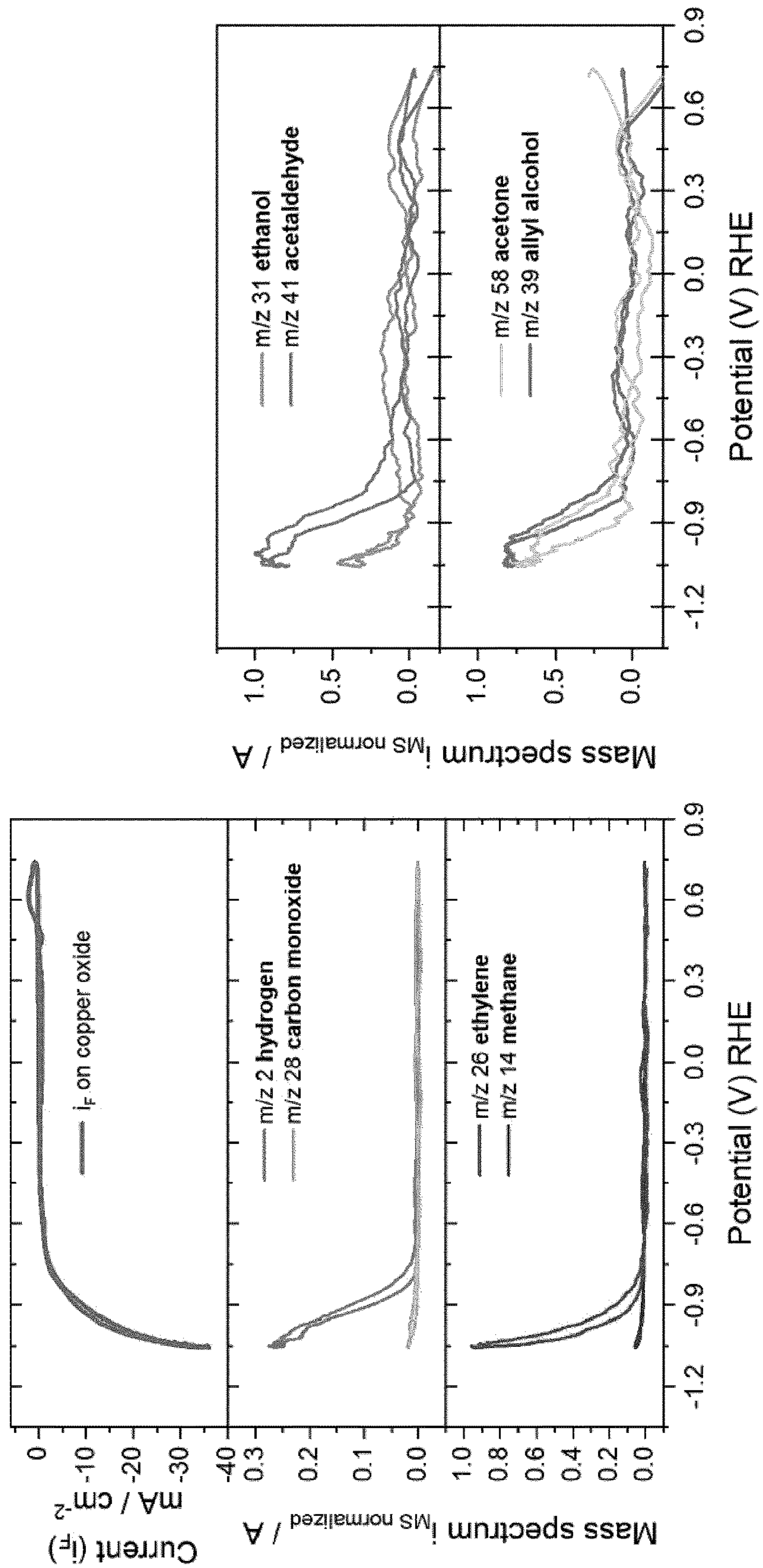
FIG. 5 shows mass spectrum of products obtained during Electroreduction of $CO_2$ on Oxide derived copper electrode.

High signal intensity and multiple products detection when $CO_2$ is used as reactant during electrochemical reduction process for direct conversion to hydrocarbon molecules. In FIG. 5 are presented the main gas products, such as methane, ethylene and CO or liquid products like ethanol, acetaldehyde, acetone and allyl alcohol. The extractor system was able to separate the gas and liquid products from the electrolyte solution at high speed to clearly differentiate the potential of starting product evolution.

FIG. 5 shows the electroreduction of $CO_2$ on Oxide derived copper electrode, electrochemical current-IF (red line); mass spectrum current for gas products with hydrogen (grey line), carbon monoxide (green line), ethylene (violet line) and methane (blue line); mass spectrum current for liquid products with ethanol (orange line), acetaldehyde (orange line), acetone (green line) and allyl alcohol (red line). Conditions: 5 $mV \cdot s^{-1}$ in 0.1 M $KHCO_3$. Saturation of electrolyte flowing at speed 12 $\mu L \cdot s^{-1}$. Ion source set in "neg" with ion source standard calibration pre-measurements. SEM voltage was set at 1050V and every mass was recorded simultaneously with Dwell time 100 a.u., resolution 50 and pause time 1. Capillary flow 2 $\mu L \cdot s^{-1}$.

Example 3

Figure 6:
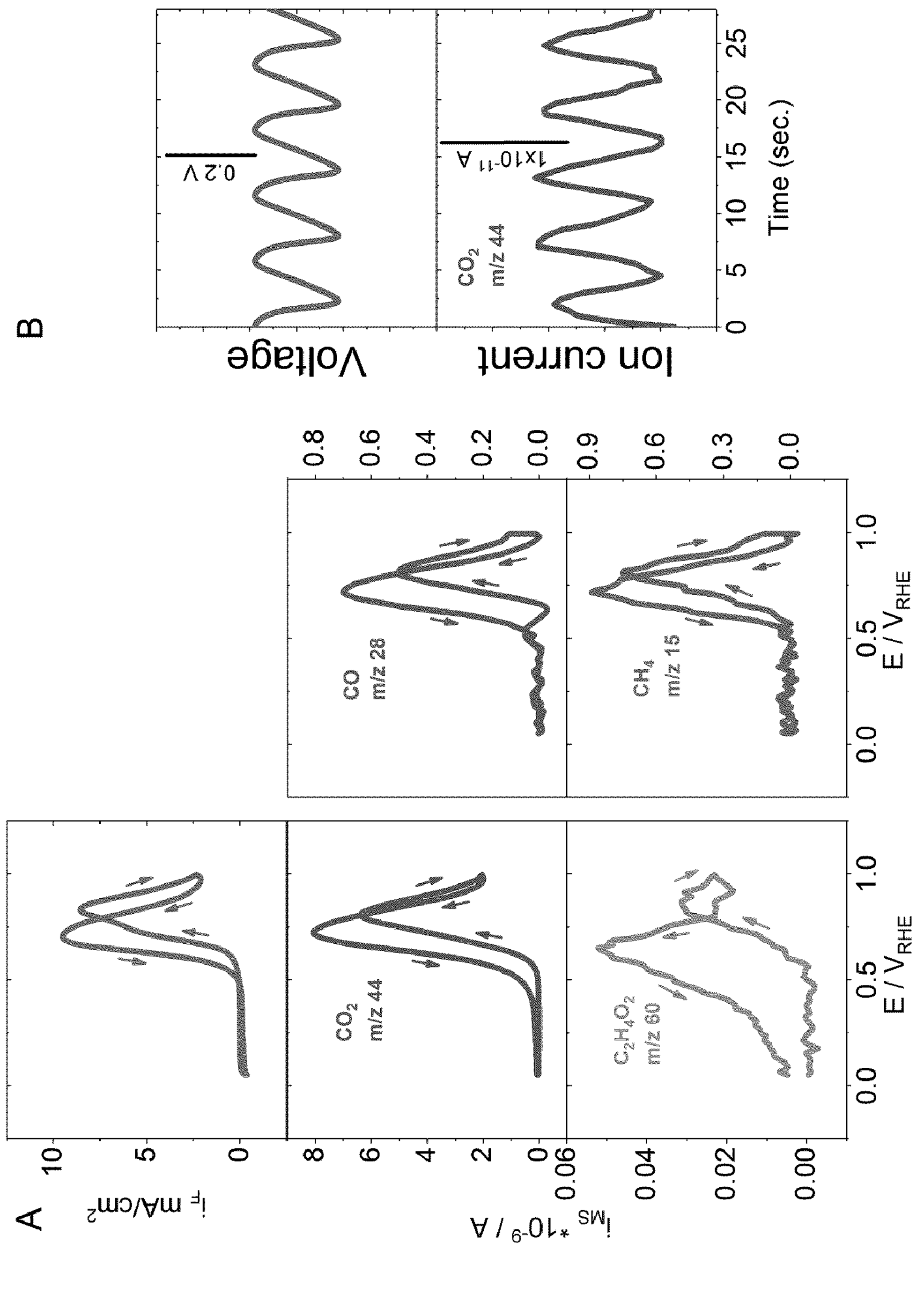
FIG. 6 shows simultaneously recorded cyclic voltammograms and mass fragments.

The most important achievement is represented by the detection of liquid products, which is done at significant time resolution. The evaporation of liquid products into the vacuum system is achieved in part due to the flexibility of the combination of the hydrophobic PTFE membrane and the frit porous material for membrane support. The other important achievement is high MS signal intensity due to high flow of analysis gas into the MS, by combining two differential pumping stages, one dedicated to the gas and liquid collector and the second for MS analysis. Two pumping stages make it possible to allow many combinations of hydrophobic membrane porosity. Due to the high volatility of methanol, analysis of MS during a methanol oxidation reaction as in FIG. 6A is only possible by combining the right set of membrane and frit porous material. Also, in FIG. 6B is presented the $CO_2$ formation during the oscillatory electro-oxidation of methanol on platinum. Such reaction conditions are only attained in stable reaction conditions at reactor cell, in part achieved using the seamless design of the capillary tube.

FIG. 6A shows simultaneously recorded cyclic voltammograms and mass fragments for carbon dioxide m/z 44, methyl formate at m/z 60, carbon monoxide at m/z 28 and methane at m/z 15, during electro-oxidation of methanol on 20 wt % platinum-nanoparticle catalyst supported on Vulcan drop coated in Ø5 mm glassy carbon. Conditions: 10 $mV \cdot s^{-1}$. FIG. 6B shows Period-one potential time series (red line) during electro-oxidation of methanol at 0.5 M $H_2SO_4$ and 1 M of methanol accompanied by mass fragments of carbon dioxide at m/z 44 (green line) in 20 wt % platinum-nanoparticle catalyst supported on Vulcan drop coated in Ø5 mm glassy carbon.

Example 4

The high vacuum regime under the membrane allows for fast extraction of converted unstable chemicals in solution, this is important to extract substances with low chemical stability or substances with no vapor pressure. A membrane coated with a catalytic active material such as Gold and Nickel is submitted to a high oxidative potential promoting an oxidation reaction to volatile MS detectable compounds. The reaction of non-detectable MS species like ionic dissolved compounds such as bicarbonate. The coated membrane is submitted to an oxidative potential using a power supply or a potentiostat instrument, which converts the ionic compounds to gaseous or volatile species such as $CO_2$. The cathode is an immersed platinum wire with thickness 0.5 mm placed at the outflow of liquid.

Figure 7:
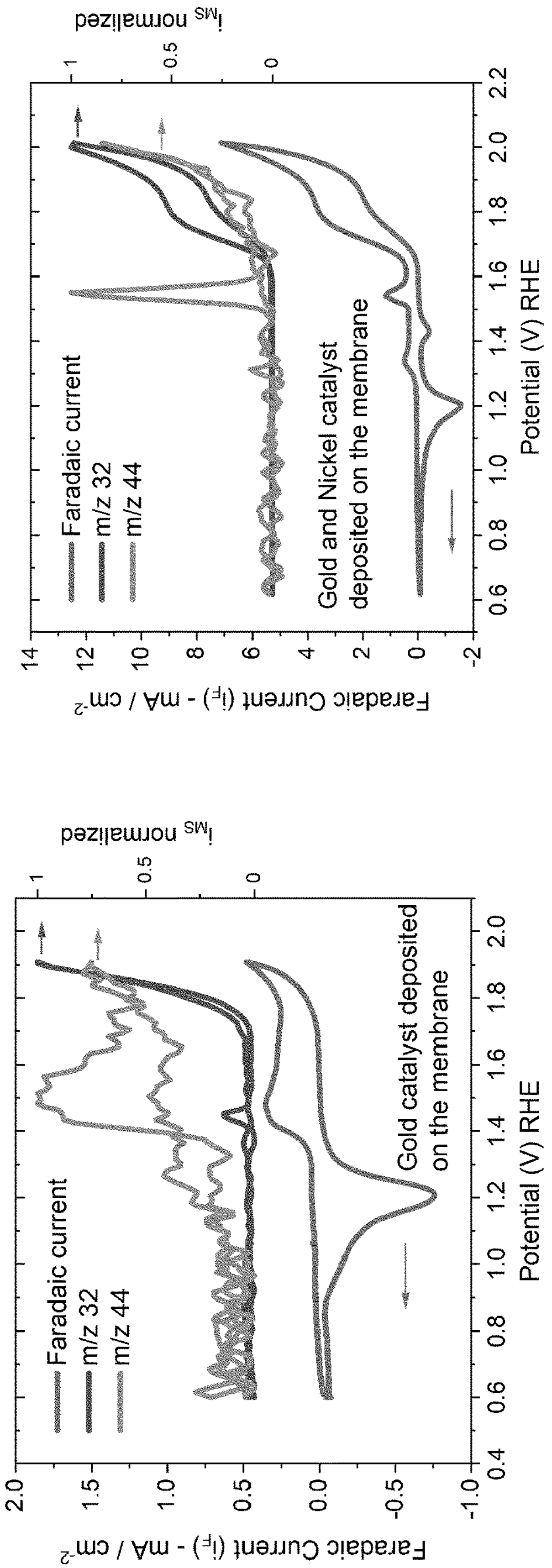
FIG. 7 shows mass spectrum of products obtained during Electro-oxidation of $HCO_3^-$ species on Gold and/or Nickel deposited electrode.

FIG. 7 shows mass spectrum signals of resulted m/z 44 $CO_2$ (orange line) and m/z 32 $O_2$ (purple line) products during electro-oxidation of 0.1M $KHCO_3$ solution on Gold and on Gold-Nickel deposited membrane electrodes. The $CO_2$ formation results from the bicarbonate oxidation, while $O_2$ evolution results from the expected OER process of water splitting.

The invention claimed is:

1. A device for extracting gaseous reaction products and liquid reaction products from a reaction fluid, from an electrochemical reaction system, the device comprising:
- at least one inlet feeding for reaction fluid into the device;
- at least one outlet for exiting a fluid depleted of said gaseous reaction products and liquid reaction products out of the device;
- a first compartment comprising a first membrane supported on a first porous material and configured to separate the gaseous reaction products from the reaction fluid using the first membrane; and a second compartment comprising a second membrane supported on a second material and configured to separate the liquid reaction products from the reaction fluid using the second membrane;

a capillary tube system configured to guide the reaction fluid from the inlet and into the first compartment whereby the reaction fluid contacts the first membrane and the gaseous reaction products separate from the reaction fluid and to subsequently guide the reaction fluid into the second compartment whereby the reaction fluid contacts the second compartment and the liquid reaction products separates from the reaction fluid;

wherein the capillary tube system fluidly connects the first compartment to the second compartment;

a first negative pressure source connected to the first compartment and configured to apply, in operation, a first sub-atmospheric pressure to the first membrane whereby the gaseous reaction products transfer through the first membrane; and a second negative pressure source connected to the second compartment and configured to apply, in operation, a second sub-atmospheric pressure to the second membrane whereby the liquid reaction products transfer through the second membrane.

2. The device according to claim 1, wherein the first compartment and second compartment are aligned along an axis.

3. The device according to claim 1, wherein the first compartment and second compartment are arranged inversely or back-to-front along the axis.

4. The device according to claim 1, wherein the first compartment comprises a first ring and a second ring, the first ring comprising a first opening and the second ring comprising a second opening and wherein the second compartment comprises a third ring and a fourth ring, the third ring comprising a third opening and the fourth ring comprising a fourth opening, wherein the first opening comprises a round piece or disc including the capillary tube system and the second opening comprises the first porous material.

5. The device according to claim 4, wherein the first membrane is disposes with the first ring and the second membrane is disposed with the second ring.

6. The device according to claim 4, wherein the second ring comprises a connection connected to the second negative pressure source.

7. The device according to claim 1, wherein at least one flow inlet and at least one flow outlet comprise a disk arranged between the first ring of the first compartment and the second ring of the second compartment.

8. The device according to claim 1, wherein the first membrane comprises polytetrafluoroethylene PTFE, polyetheretherketone PEEK, polyvinylidene fluoride PVDF, or silicone; or a film directly deposited on the first porous material or a thin layer directly deposited on the first porous material and the second membrane comprises polytetrafluoroethylene PTFE, polyetheretherketone PEEK, polyvinylidene fluoride PVDF, or silicone; or a film directly deposited on the second porous material or a thin layer directly deposited on the second porous material.

9. The device according to claim 1, wherein the first membrane in the first compartment has a porosity between 10 and 30 nm, and a thickness between 100 and 200 μm and the first porous material is a first frit having a porosity between 0.3 and 0.8 μm, and a thickness between 2 and 6 mm.

10. The device according to claim 1, wherein the second membrane in the second compartment has a porosity between 30 and 80 nm, and a thickness between 100 and 200 μm and the second porous material is a second frit having porosity between 5 and 15 μm, and a thickness between 2 and 6 mm.

11. A method of extracting gaseous reaction products and liquid reaction products from a reaction fluid using the device according to claim 1, the method comprising:

feeding a reaction fluid comprising gaseous reaction products and liquid reaction products into the device through the at least one inlet into the first compartment such that the gaseous reaction products are first separated from the reaction fluid in the first compartment via the first membrane under the first sub-atmospheric pressure provided by the first negative pressure source, and the liquid reaction products are subsequently separated through evaporation from the reaction fluid in the second compartment a via the second membrane under the second sub-atmospheric pressure provided by the second negative pressure source, wherein the first sub-atmospheric pressure is lower than the second sub-atmospheric pressure and the gaseous reaction products transfer through the first membrane and the liquid reaction products transfer through the second membrane for analysis, and a fluid depleted of said gaseous reaction products and of said liquid reaction products exit out of the device through the at least one outlet.

12. The method according to claim 11, wherein the first sub-atmospheric pressure in the first compartment is between 5 and 15 mbar and the second sub-atmospheric pressure in the second compartment is between 50 and 150 mbar.

13. The method according to claim 11, wherein the first sub-atmospheric pressure is between $10^{-2}$ and $10^{-3}$ mbar.

14. The method according to claim 11, further comprising analyzing the gaseous reaction products separated from the reaction fluid and analyzing the liquid reaction products separated from the reaction fluid suing a mass spectrometer.

* * * * *